United States Patent
Smith et al.

(10) Patent No.: US 7,124,230 B2
(45) Date of Patent: Oct. 17, 2006

(54) USE OF BUS TRANSACTION IDENTIFICATION CODES

(75) Inventors: David Russell Smith, Phoenix, AZ (US); Richard Paul Mackey, Phoenix, AZ (US); Joseph Murray, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 10/136,660

(22) Filed: Apr. 30, 2002

(65) Prior Publication Data

US 2003/0204662 A1    Oct. 30, 2003

(51) Int. Cl.
*G06F 13/36* (2006.01)
*G06F 13/372* (2006.01)
*G06F 13/00* (2006.01)

(52) U.S. Cl. ............... 710/310; 710/306; 710/129; 710/301

(58) Field of Classification Search ........... 710/306, 710/310, 129, 301
See application file for complete search history.

(56) References Cited

U.S. PATENT DOCUMENTS

| 5,857,082 A * | 1/1999 | Murdoch et al. | 710/310 |
|---|---|---|---|
| 6,205,506 B1 * | 3/2001 | Richardson | 710/310 |
| 6,230,228 B1 * | 5/2001 | Eskandari et al. | 710/310 |
| 6,480,488 B1 * | 11/2002 | Huang | 370/389 |
| 6,549,964 B1 * | 4/2003 | Lai et al. | 710/107 |
| 6,574,691 B1 * | 6/2003 | Jirgal et al. | 710/100 |
| 6,581,129 B1 * | 6/2003 | Buckland et al. | 710/306 |
| 6,594,722 B1 * | 7/2003 | Willke et al. | 710/313 |
| 6,636,927 B1 * | 10/2003 | Peters et al. | 710/309 |
| 6,834,320 B1 * | 12/2004 | Stoess et al. | 710/310 |
| 2003/0046473 A1 * | 3/2003 | Dobson et al. | 710/306 |
| 2003/0065847 A1 * | 4/2003 | Goodrum et al. | 710/113 |
| 2003/0110340 A1 * | 6/2003 | Butler et al. | 710/305 |
| 2003/0196019 A1 * | 10/2003 | Moertl et al. | 710/310 |
| 2004/0172493 A1 * | 9/2004 | Askar | 710/305 |

OTHER PUBLICATIONS

PCI-X Addendum to the PCI Local Bus Specification, Revision 1.0a, Jul. 24, 2000 (pp. 1-239).

* cited by examiner

*Primary Examiner*—John R. Cottingham
*Assistant Examiner*—Christopher A. Daley
(74) *Attorney, Agent, or Firm*—Marger Johnson & McCollom, P.C.

(57) ABSTRACT

A peripheral component interconnect-extended system that includes a bus bridge. The bus bridge includes an input queue adapted to receive a first request for data from a requesting device coupled to a first bus. The first bus is coupled to the bus bridge, and the first request containing a sequence identification information. The bus bridge also includes a data storage device to contain information to control the bus bridge, and a processor that associates a first unique identification code to the first request.

29 Claims, 2 Drawing Sheets

USE OF BUS TRANSACTION IDENTIFICATION CODES

BACKGROUND

In a PCI-X system, a system in accordance with the Peripheral Component Interconnect (PCI) Special Interest Group's (SIG) PCI-Extended standard, master devices do not constantly send these queries or expect constant acknowledgements or responses from the slave device. Instead, once a master device sends a request to a slave device, the slave device becomes the master device and as a master device sends the requested data to the original requester. For clarity, the original master device will be referred to as a "requester" or "requesting device", and the original slave device will be referred to as a "responder" or "responding device".

BRIEF DESCRIPTION OF THE DRAWINGS

Embodiments of the invention may be best understood by reading the disclosure with references to the drawings, wherein.

DETAILED DESCRIPTION OF THE EMBODIMENTS

Figure 1:
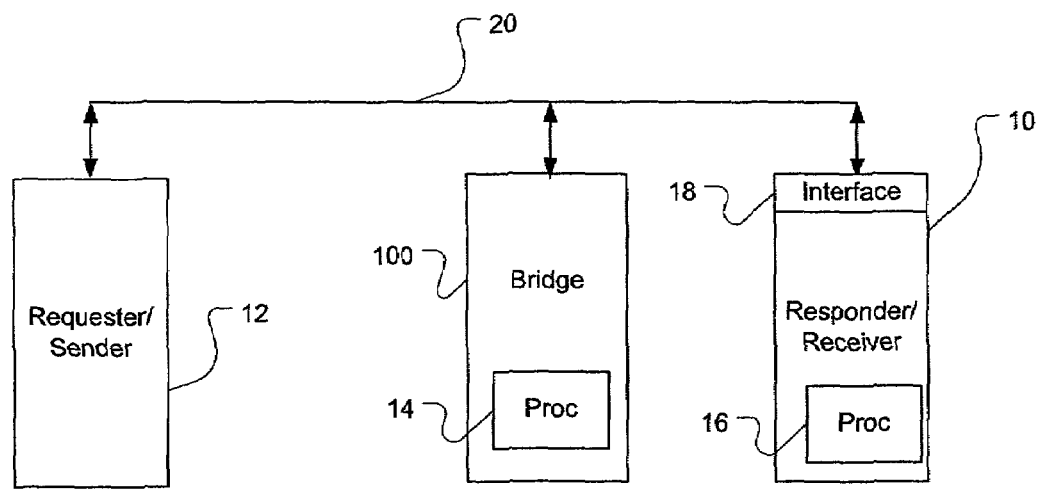
FIG. 1 is a block diagram of a PCI-X system.

The processing of requests on a PCI-X local bus is as follows. A PCI-X local bus has an address phase, an attribute phase and one or more data phases. During the address phase, the master device sends an address onto the bus, which address falls within the range of a selected slave device connected to the bus. The requester then sends attributes during the attribute phase, which comprises the requester's unique identification number and a 5-bit tag. The requester sets the tag to a unique number so that each request can be differentiated. The responder receives the address and if it falls within the range of the responder's addresses, the responder may determine that the data request is intended for the responder. A PCI-X responder has a queue to receive multiple requests. When the responder receives the attributes from the requester, the responder saves the sequence identification from the request, the sequence identification being the requester's identification number and the tag. This information is saved in the responder so that when the responder eventually sends data to the requester, the requester may determine that the data is intended for the requester. The responder may process multiple requests simultaneously and, thus, may contain multiple unique sequences.

If the request asks for a large amount of data, the responder may break the data request into smaller data requests (e.g., a "sub request"). The responder will send each data portion in response to each one of the sub requests to the requester. For example, if a requester issues a request for 4 Kbytes of data, the responder may break the request into four 1K sub requests. When the responder sends 1K of data responsive to one of the sub requests, this portion is called a "sub split completion" because the data represents only a portion of the total data that was requested by the requester.

The term "split" in this context refers to a transaction that is handled by both a requester and a responder.

Each PCI-X data sequence is identified by its sequence ID. The sequence ID includes the Bus Number, Device Number and Function Number of the requester, and the tag of the sequence. At times and as mentioned above, a responder may break a data request into multiple sub requests. In this case, split completions for the data request may be routed to the requester so that the requester receives all of the data. In order for the responder to properly route the split completions belonging to a received request back to the requester, the responder relies on a unique sequence ID.

The transaction handler of the PCI-X responder should be able to differentiate between these split completions in order to route them properly and to enforce ordering rules. The prior art attempts to identify which split completions belong to which data request (e.g., request #1 or request #2) by associating a sequence ID with each data request and relying on the assumption that no two received requests share the same sequence ID. However, this assumption is not always true as will be explained below.

In the ideal process, the requester may determine that its request was split. The requester looks for its address on the bus during a subsequent address phase. The responder sends split completion data to the requester. During the address phase, the responder sends a sequence ID on the bus, the sequence ID containing the unique ID of the requester and the tag. When the requester sees its ID on the bus during the address phase, the requester asserts itself and accepts data from the responder. By examining the tag in the sequence ID, the requester may determine to which request the split completion data belongs because the requester may determine that the tag was unique for each of its requests.

There are circumstances where a responder may receive requests having the same sequence ID. As a first example, when the responder returns a split completion error message to the requester, the requester considers the request to have been completed so the requester believes it is free to reuse the tag in the sequence ID. Even though a request is considered terminated from the requester's point of view, the request may not be considered terminated from the responder's point of view since the responder may still be processing sub requests for the request on the target bus. The requester is not acting improperly because the requester will not reuse a tag unless the request is terminated. The requester may reuse the tag since it is legal for the requester to do this. The responder now holds two requests that have the same sequence ID, a violation of the system's assumption.

In the second example, a responder may have a port that converts a posted write request on its target interface to a non-posted write request on its initiating interface, which may be split by a responder. It is possible that a requester can issue a posted memory write with a tag value of 0 to the responder's input/output port, followed by a memory read request to the responder's input/output port using the same tag. The requester is able to use the same tag because the memory write was posted, making the tag immediately reusable. The responder now contains two different split requests that have the same sequence ID. The prior art PCI-X responder is susceptible to transaction corruption if it relies on sequence ID's to identify sequences. Therefore, there is a need for a more robust method of identifying a sequence in a PCI-X responder device.

FIG. 1 shows a system level block diagram representation of an embodiment of a PCI-X system including a sending or requesting device 12, and a responding or receiving device 10. The system may include a PCI-X bridge 100. All of these devices are coupled to the PCI-X bus 20. The requester 12 sends a request on the PCI-X bus 20. The PCI-X device 10 processes requests. The PCI-X local bus 20 has an address phase, an attribute phase and one or more data phases. During the address phase, the requesting device 12 sends an address onto the bus 20, which address falls within the range of a selected slave device, in this embodiment responder 10. The requester then sends attributes during the attribute phase, which comprises the requester's unique identification number and a five-bit tag. The requester sets the tag to a unique number. However, as explained above, the "unique number" of the tag may not actually be unique to the responder 10 so the PCI-X device 10 uses a novel process to guarantee a unique identification of each received request.

Figure 2:
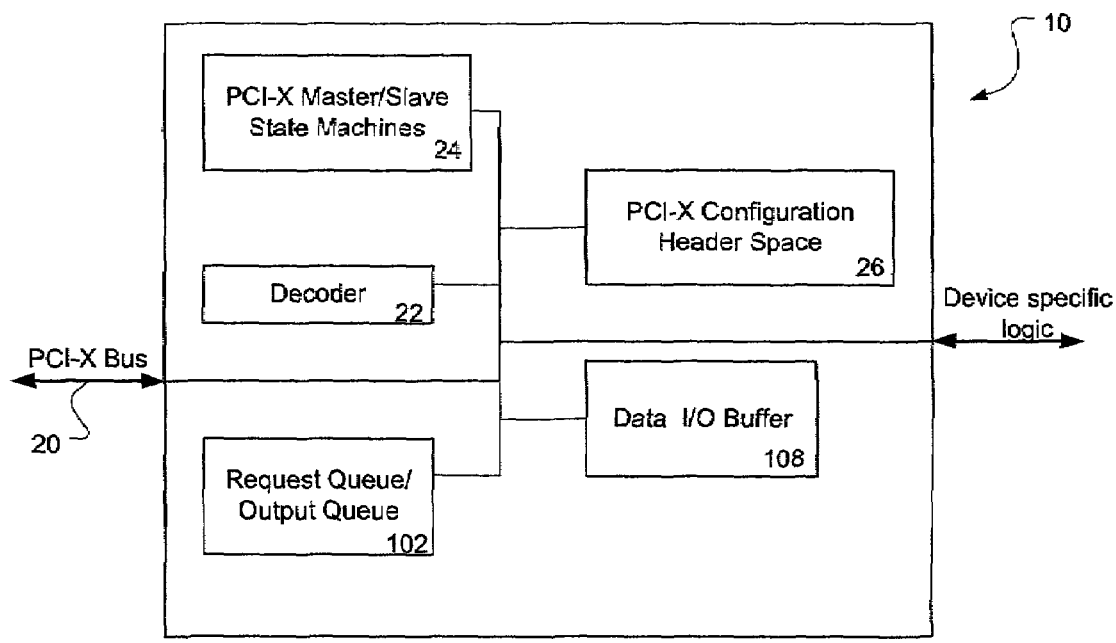
FIG. 2 is a block diagram of an embodiment of a PCI-X responder device.

FIG. 2 shows a block diagram of PCI-X device 10. The PCI-X responder device 10 receives the address and if it falls within the range of the PCI-X responder device's addresses, the PCI-X responder device 10 may determine that the data request is intended for the PCI-X responder device 10. Incoming data requests are stored in request/output queue 102. When the PCI-X responder device 10 receives the attributes from the requester 12 of FIG. 1, the PCI-X responder device 10 saves the sequence identification from the request. The example PCI-X responder device 10 includes a decoder 22, which decodes requests and instructions, a PCI-X protocol master/slave state machine 24, which controls the master/slave operation of the device 10, a PCI-X configuration header space 26, which stores the registers that control the behavior of the device 10, and a data storage device or queue 108, which may be a first-in-first-out (FIFO) queue. The PCI-X master/slave state machine, the decoder and the configuration header space may all be contained in the processor 16 of FIG. 1.

Figure 3:
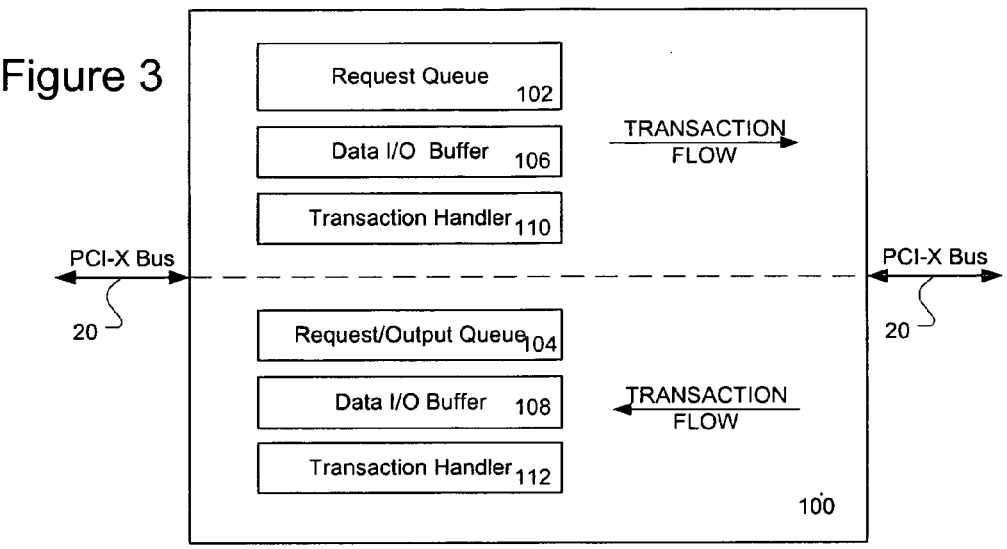
FIG. 3 is a block diagram of an embodiment of a PCI-X bridge.

FIG. 3 is a block diagram representation of an embodiment of a PCI-X bridge 100. A PCI-X bridge forwards requests that it receives, whereas a PCI-X responder device (non-bridge) does not forward the request because the PCI-X responder device is the target and consumes the request. The PCI-X bridge 100 may have request queues 102 and 104, data queues 106 and 108, and transaction handlers 110 and 112. The transaction handlers 110 and 112 may be included in the processor 14 of FIG. 1. When the PCI-X bridge 100 receives a request from the PCI-X bus 20, the request is stored in the request queue. For example, if the PCI-X bridge 100 receives a write request from the sender 14 of FIG. 1, the write request is stored into the request queue 102 and the data to be written is stored in data queue 106. On the other hand, if the PCI-X bridge 100 receives a read request from the requester 12 of FIG. 1, the read request is stored into the request queue 102 and the data returned in response to the read request is stored in data queue 108. The data queues may also be referred to as input or output queues. Of course, read and write requests may also be received and processed for both the requester and receiver of FIG. 1.

If the PCI-X bridge 100 were instead a PCI-X application bridge, the application bridge would be coupled to the PCI-X bus 20 and a non-PCI-X bus (not shown). When the PCI-X bridge 100 receives a request, the bridge 100 may respond in two different ways to the requester. For the first option, if the PCI-X bridge 100 currently holds the data that the responder is asking for, the bridge 100 forwards the data immediately. For the second option, if the bridge 100 does not have the requested data, the bridge 100 should forward the request to the target bus. To inform the requester of this action, the bridge 100 tells the requester that there will be a Split Response, meaning that the requester will receive the data in a subsequent split completion from the responder and that the requester should look for an address phase that matches the sequence ID of the request (e.g., the requester's ID and a five-bit tag). When a bridge 100 splits a request from a requester and forwards it using sub requests, this is not referred to as a "split request". Rather, the request becomes a "split request" if a responder responds to a request by asserting a Split Response condition.

Instead of relying upon the sequence identification contained in the request, the PCI-X responder device generates a unique identification code for each received request that is associated with transactions that belong to the same sequence, such as split completion data or split completion error messages. The following table illustrates an example of how the unique identification code can be assigned to sequences having identical sequence ID's.

| PCI-X SEQUENCE ID | VALUE OF PCI-X RESPONDER'S UNIQUE ID CODE |
|---|---|
| Bus Number = 0.<br>Device Number = 1.<br>Function Number = 0.<br>Tag = 5. | 0 |
| Bus Number = 0.<br>Device Number = 1.<br>Function Number = 0.<br>Tag = 5. | 1 |

If the request asks for a large amount of data, the PCI-X responder device may break the data request into smaller data requests (e.g., a "sub request"). The PCI-X responder device will send each data portion pertaining to each one of the sub requests to the requester. For example, if a requester issues a request for 4K of data, the PCI-X responder device may break the request into four 1K sub requests. When the PCI-X responder device sends 1K of data (which is responsive to one of the sub requests), this portion is a sub split completion because the 1K data represents only a portion of the 4K data that was requested.

Figure 4:
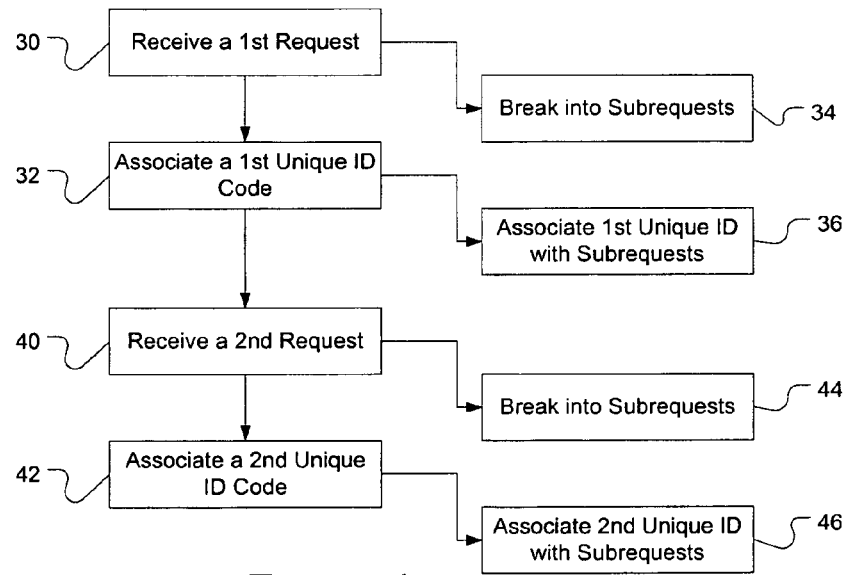
FIG. 4 is a flowchart of one embodiment of a method of sending and receiving requests in a PCI-X bridge.

Thus, the PCI-X responder device may break a data request into multiple sub requests. In order for the PCI-X responder device to determine which split completions belong to a particular received request that should be routed to the same requester, the PCI-X responder device relies on the unique identification code that the PCI-X responder device assigned to the request. Therefore, the PCI-X responder device does not rely on the sequence ID. This is shown in FIG. 4.

At 30, the responder receives a first request and associates with it a first unique ID at 32. This first request may optionally be broken into multiple sub requests at 34 and each sub request is associated with the unique ID at 36. At 40, the responding device may receive a second request. A second unique ID is assigned to that request at 42. This process may include optionally breaking the request into multiple sub requests at 44 and associating the unique ID with each sub request at 46.

For example, suppose a requester sends data request #1 to the PCI-X responder device and the PCI-X responder device breaks the data request #1 into multiple sub requests. The PCI-X responder device assigns a unique identification code (e.g., zero) to each sub request of data request #1. Suppose that the requester then sends data request #2 to the PCI-X responder device, which breaks the request into multiple sub requests, each of which is assigned a unique identification code (e.g., one). The PCI-X responder device may receive split completions for data request #1 and for data request #2 from various data storage devices. Even if the split completions are received intermingled with each other, the PCI-X responder device can use the unique identification code to determine which split completion belongs to which data request (e.g., data request #1 or #2). Since the PCI-X responder device may determine which split completion (or split completion error message) belongs to which data request, the PCI-X responder device can send them to the requester in a manner so that the requester also may determine which split completion (or split completion error message) belongs to which data request.

PCI-X bridges and PCI-X application bridges may also benefit from internally generating unique identification codes for sequences. An example of applying the invention to a PCI-X application bridge is now discussed. Suppose that the bridge receives a request for 4K of data from a requester and that the bridge breaks the request into four 1K sub requests. After sending the first 1K sub request to a target responder device, the bridge may receive either split completion data or a split completion error message from the responder. The bridge then forwards the split completion data or a split completion error message to the requester. The bridge creates a unique identification code for each request received from the requester. If the received request is broken into sub requests, the unique identification code is associated with each of the sub requests. The bridge does not use the sequence ID that is associated with the original request. Thus, if request #1 for 4K of data is broken into four 1K sub requests, the bridge gives each of the 1K sub requests the same unique, internally generated identification code. If request #2 for 2K of data arrives, which is to be broken into two 1K sub requests, the bridge gives those two sub requests a unique, internally generated identification code that is different than the identification code for the four sub requests of request #1. Therefore, when split completion data or split completion error messages arrive, the system determines to which request each belongs. Even if split completions from different requests may have the same sequence ID, they are guaranteed to have unique identification codes. As a result, none of the split completions for request #2 will be confused for split completions for request #1.

By using the internally generated identification code instead of the sequence ID's, the PCI-X responder is able to identify which sequences belong together without transaction corruption. While each sequence ID in a PCI-X responder is not necessarily unique, each internally generated identification code is guaranteed by the device to be unique because the responder who determines about each sub request is the one that generates the identification code. By assigning a truly unique identification code to the sub requests that belong together, each set of sub requests can be readily differentiated.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. As another example, each feature of one embodiment can be mixed and matched with other features shown in other embodiments. Features and processes known to those of ordinary skill in the art of networking may similarly be incorporated as desired. Additionally and obviously, features may be added or subtracted as desired. Accordingly, the invention is not to be restricted except in light of the attached claims and their equivalents.

We claim:

1. A bus bridge comprising:
    an input queue adapted to receive, in sequential and non-sequential order, read requests and write requests for read data and write data, respectively, from a requesting device coupled to a first bus, wherein the first bus is coupled to the bus bridge, each of the requests containing sequence identification information;
    a write data buffer to contain the write data of the write requests;
    a read data buffer to contain the read data of the read requests;
    a data storage device to contain information to control the bus bridge; and
    a processor to associate a first unique identification code, other than the sequence identification information, to a first request and if the bus bridge receives a second request for data, the bus bridge associates a second unique identification code to the second request.

2. The bus bridge of claim 1, wherein a responding device breaks the first request into a first plurality of sub requests, the processor of the bus bridge to associate each of the first plurality of sub requests with the first unique identification code.

3. The bus bridge device of claim 1 wherein the bus bridge sends data corresponding to each of the first plurality of sub requests belonging to the first request to the requesting device.

4. The bus bridge of claim 3 further comprising an output queue adapted to store data corresponding to each of the first plurality of sub requests belonging to the first request for sending to the requesting device.

5. The bus bridge of claim 1 wherein a responding device breaks the second request into a second plurality of sub requests, the processor of the bus bridge to associate each of the second plurality of sub requests with the second unique identification code.

6. The bus bridge of claim 1 wherein the data storage device stores the sequence identification information received over a PCI-X bus, the sequence identification information including an identification number of the requesting device and a tag identifying the first request.

7. A responding device comprising:
    an interface to couple the responding device to a peripheral component interconnect extended (PCI-X) bus;
    an input queue to receive, in sequential and non-sequential order, requests from a requesting device coupled to the PCI-X bus, each of the requests containing sequence identification information;
    an output queue to output read data to the PCI-X bus; and
    a processor to associate a first unique identification code, other than the sequence identification information, to a first request and if the responding device receives a second request for data, the responding device associates a second unique identification code to the second request.

8. The responding device of claim 7 wherein the responding device breaks the first request into a first plurality of sub requests, the processor of the responding device associates each of the first plurality of sub requests with the first unique identification code.

9. The responding device of claim 8 wherein the responding device sends data corresponding to each of the first plurality of sub requests belonging to the first request to the requesting device.

10. The responding device of claim 7 further comprising an output queue adapted to store data for sending to the requesting device.

11. The responding device of claim 7 wherein the responding device breaks the second request into a plurality of sub requests, the processor of the responding device associates each of the second plurality of sub requests the second unique identification code.

12. The responding device of claim 7 further comprising a data storage device to store the sequence identification information, the sequence identification information including the identification number of the requesting device and a tag identifying the first request.

13. A method of processing read requests and write requests for data on a peripheral component interconnect extended (PCI-X) bus, the method comprising:
receiving, in non-sequential order, read requests and write requests for data from a requesting device coupled to the PCI-X bus, each of the requests containing a tag identifying the respective request; and
associating a first unique identification code, other than sequence identification information, to a first request.

14. The method of claim 13, wherein the method further comprises breaking the first request into a first plurality of sub requests and associating each of the first plurality with the first unique identification code.

15. The method of claim 13, the method further comprising:
receiving a second request; and
associating a second unique identification code to the second request.

16. The method of claim 15, wherein the method further comprises breaking the second request into a second plurality of sub requests and associating each of the second plurality with the first unique identification code.

17. The method of claim 13 further comprising sending data corresponding to the first request to the requesting device coupled to the PCI-X bus.

18. The method of claim 15 wherein the first and second requests were sent by the same requesting device.

19. The method of claim 13 further comprising storing the tag.

20. An article of machine-readable code that, when executed, causes the machine to:
receive, in non-sequential order, read requests and write requests for data from a requesting device, each of the requests containing a tag identifying the respective request; and
associate a first unique identification code, other than sequence identification information, to a first request.

21. The article of claim 20 the code further causing the machine to:
receive a second request; and
associate a second unique identification code to the second request.

22. The article of claim 20, wherein the code further causing the machine to: send data corresponding to the first request to the requesting device coupled to a PCI-X bus.

23. The article of claim 20, wherein the code further causing the machine to: break the first request into a plurality of first sub requests and associate each of the first sub requests with the first unique identification code.

24. The article of claim 20, wherein the code further causing the machine to: break the second request into a plurality of second sub requests and associate each of the second sub requests with the second unique identification code.

25. The article of claim 21 wherein the first and second requests were sent by the same requesting device.

26. The article of claim 20 the code further causing the machine to: store the tag.

27. A PCI-X system, comprising:
a sending PCI-X sending device to send read requests and write requests; and a receiving PCI-X responding device to receive, in sequential and non-sequential order, the read requests and write requests and to associate a unique identification code, other than sequence identification information, to each of the requests.

28. The PCI-X system of claim 27, wherein the responding device breaks the requests into a plurality of sub requests, and associates each of the plurality of sub requests with the unique identification code.

29. The PCI-X system of claim 27, wherein the system further comprises a bus bridge.

* * * * *